United States Patent
Huang et al.

(10) Patent No.: US 10,251,188 B2
(45) Date of Patent: Apr. 2, 2019

(54) BASE STATION AND RADIO RESOURCE DYNAMIC ALLOCATION METHOD FOR NARROWBAND INTERNET OF THING SYSTEM

(71) Applicant: Institute For Information Industry, Taipei (TW)

(72) Inventors: Yong-Shin Huang, Chiayi County (TW); Ya-Ju Yu, Kaohsiung (TW); Sheng-Chia Tseng, Chiayi (TW); Li Wan, Taipei (TW)

(73) Assignee: Institute For Information Industry, Taipei (TW)

( * ) Notice: Subject to any disclaimer, the term of this patent is extended or adjusted under 35 U.S.C. 154(b) by 71 days.

(21) Appl. No.: 15/655,754

(22) Filed: Jul. 20, 2017

(65) Prior Publication Data
US 2019/0021098 A1    Jan. 17, 2019

(30) Foreign Application Priority Data

Jul. 17, 2017    (TW) .............................. 106123807 A

(51) Int. Cl.
    *H04W 72/04*      (2009.01)
    *H04W 72/12*      (2009.01)
    *H04W 88/08*      (2009.01)

(52) U.S. Cl.
    CPC ..... *H04W 72/121* (2013.01); *H04W 72/1231* (2013.01); *H04W 72/1289* (2013.01); *H04W 88/08* (2013.01)

(58) Field of Classification Search
CPC ..... H04L 5/0053; H04L 5/001; H04L 5/0094; H04L 5/0007; H04L 5/0023; H04L 5/0048; H04L 27/2647; H04L 5/1469; H04L 1/0027; H04L 5/0035; H04L 5/0057
See application file for complete search history.

(56) References Cited

U.S. PATENT DOCUMENTS

2017/0325258 A1* 11/2017 Nogami ................. H04J 11/00
2017/0338907 A1* 11/2017 Atungsiri ............. H03M 13/27
2018/0007683 A1*  1/2018 You ...................... H04L 1/0067

* cited by examiner

*Primary Examiner* — Sai Aung
(74) *Attorney, Agent, or Firm* — Skaar Ulbrich Macari, P.A.

(57) ABSTRACT

A base station and a radio resource dynamic allocation method thereof for a Narrowband Internet of Thing (NB IoT) system are provided. The base station determines that a plurality of user equipments (UEs) are involved in radio resource scheduling and allocation according to scheduling information, and determines a received signal quality of each UE according to a feedback message received from each UE. Afterwards, according to the received signal quality of each UE, the base station performs a downlink control information (DCI) subframe repetition number evaluation and adjustment procedure to determine whether a DCI subframe repetition number of the each UE in a narrowband physical downlink control channel needs to be adjusted and adjust the DCI subframe repetition number which needs to be adjusted. After the DCI subframe repetition number evaluation and adjustment procedure, the base station executes the radio resource scheduling and allocation.

16 Claims, 10 Drawing Sheets

BASE STATION AND RADIO RESOURCE DYNAMIC ALLOCATION METHOD FOR NARROWBAND INTERNET OF THING SYSTEM

PRIORITY

This application claims priority to Taiwan Patent Application No. 106123807 filed on Jul. 17, 2017, which is hereby incorporated by reference in its entirety.

FIELD

The present invention relates to a base station and a radio resource dynamic allocation method thereof for a Narrowband Internet of Thing (NB-IoT) system. In particular, for a user equipment (UE) involved in radio resource scheduling and allocation, the base station of the present invention evaluates whether a downlink control information (DCI) subframe repetition number of the UE in a narrowband physical downlink control channel needs to be adjusted according to a feedback message received from the UE and then makes adjustment accordingly.

BACKGROUND

In recent years, various wireless communication systems, especially wireless communication systems of cellular network architectures, have been developed continuously due to the rapid development of wireless communication technologies so as to satisfy various communication demands and applications in people's daily life. A Narrowband Internet of Things (NB-IoT) system is one of the wireless communication systems developed in recent years, and it mainly aims at user equipments (UEs) characterized by low power consumption, low complexity, low cost, high transmission delay tolerance, or the like, so it has become the wireless communication system most actively developed currently for IoT devices.

In currently existing NB-IoT systems, in order to enable downlink control information (DCI) to be transmitted to UEs around cell edge of a base station, the base station repeats the transmission of the DCI so as to improve the possibility of successfully decoding the data at the UE end.

In detail, the base station configures the DCI subframe repetition number in a narrowband physical downlink control channel (NPDCCH) according to a coverage enhancement level (CE Level) where the UE is located. However, the DCI subframe repetition number is configured for all UEs in each of the CE levels, so the base station performs the radio resource scheduling and allocation based on the same DCI subframe repetition number for all the UEs at a same CE level. For example, if the CE levels are divided into three levels and the DCI subframe repetition numbers corresponding to the three levels are respectively configured to be 2, 4, and 8, then the base station allocates the subframe at the DCI subframe repetition number corresponding to the CE level where the UE is located, thereby transmitting the downlink control information to the UE.

However, for the UE near the base station and thus performing well in receiving signals, even if the number of continuous subframes required by the UE for correctly decoding the DCI is less than the corresponding DCI subframe repetition number (e.g., the configured DCI subframe repetition number is 4, but actually the UE can correctly decode the DCI simply by receiving the DCI repeatedly transmitted in 2 continuous subframes), the base station still transmits the DCI repeatedly by using continuous subframes corresponding to the configured DCI subframe repetition number in the current radio resource allocation mechanism. In other words, the base station in the prior art configures the DCI subframe repetition number only based on the CE levels instead of configuring the DCI subframe repetition number based on individual UEs (especially the individual UEs in a same CE level). In this case, since the NPDCCH radio resources configured are limited, even if the narrowband physical downlink share channel (NPDSCH) or the narrowband physical uplink share channel (NPUSCH) still have radio resources to be allocated, the base station still cannot allocate the NPDSCH radio resources or the NPUSCH radio resources remaining unallocated to other UEs because no radio resource is available for allocation in the NPDCCH to transmit DCI of other UEs.

For example, as shown in FIG. 1, if the NPDCCH radio resources configured in each NPDCCH period are 16 subframes, then for the UEs whose DCI subframe repetition number configured corresponding to the CE level is 4, the NPDCCH radio resources can only be allocated to four UEs at the CE level. In this case, even if the NPDSCH still have radio resources to be allocated in the same NPDCCH period, the base station still cannot allocate the NPDSCH radio resources remaining unallocated to a fifth UE, or the base station cannot allocate the corresponding NPUSCH radio resources to the fifth UE in the NPDCCH period. Accordingly, the current radio resource allocation mechanism cannot optimize the radio resource scheduling and allocation to serve more UEs with the limited radio resources.

Accordingly, an urgent need exists in the art to provide a radio resource allocation mechanism so as to serve more UEs with the limited radio resources, thereby preventing the waste of the radio resources, and thus improving the utilization ratio of the radio resources, the total throughput capacity of the system, and the resource scheduling flexibility.

SUMMARY

An objective of certain disclosed embodiments is to provide a radio resource dynamic allocation mechanism, which determines a received signal quality of each of UEs according to a feedback message received from each of the UEs to dynamically adjust the DCI subframe repetition number of each of the UEs so that the configuration of the DCI subframe repetition number is not completely limited by the CE level. In this way, the present invention can perform the radio resource scheduling and allocation based on the DCI subframe repetition number dynamically adjusted for each of the UEs so as to serve more UEs with the limited radio resources, thereby preventing the waste of the radio resources, and thus improving the utilization ratio of the radio resources, the total throughput capacity of the system, and the resource scheduling flexibility.

The disclosure inclueds a base station for a Narrowband Internet of Thing (NB-IoT) system, which comprises a storage, a transceiver and a processor. The storage is configured to store scheduling information. The processor is electrically connected to the storage and the transceiver. The processor is configured to execute the following steps: determining that a plurality of user equipments (UEs) are involved in radio resource scheduling and allocation according to the scheduling information; determining a received signal quality of each of the UEs according to a feedback message received from each of the UEs via the transceiver; performing a downlink control information (DCI) subframe repetition number evaluation and adjustment procedure according to the received signal quality of each of the UEs to determine whether a DCI subframe repetition number of each of the UEs in a narrowband physical downlink control channel (NPDCCH) needs to be adjusted, and adjusting the DCI subframe repetition number which needs to be adjusted; and executing the radio resource scheduling and allocation after the DCI subframe repetition number evaluation and adjustment procedure.

The disclosure also includes a radio resource dynamic allocation method for a base station of an NB-IoT system. The base station comprises a storage, a transceiver and a processor. The storage stores scheduling information. The radio resource dynamic allocation method is executed by the processor and comprises the following steps: determining that a plurality of UEs are involved in radio resource scheduling and allocation according to the scheduling information; determining a received signal quality of each of the UEs according to a feedback message received from each of the UEs via the transceiver; performing a downlink control information (DCI) subframe repetition number evaluation and adjustment procedure according to the received signal quality of each of the UEs to determine whether a DCI subframe repetition number of each of the UEs in a narrowband physical downlink control channel (NPDCCH) needs to be adjusted, and adjusting the DCI subframe repetition number which needs to be adjusted; and executing the radio resource scheduling and allocation after the DCI subframe repetition number evaluation and adjustment procedure.

The detailed technology and preferred embodiments implemented for the subject invention are described in the following paragraphs accompanying the appended drawings for people skilled in this field to well appreciate the features of the claimed invention.

DETAILED DESCRIPTION

In the following description, certain embodiments of the present invention will be explained with reference to example embodiments thereof, and these example embodiments are not intended to limit the invention to any particular example, embodiment, environment, applications or implementations described in these example embodiments. Therefore, description of these expel embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
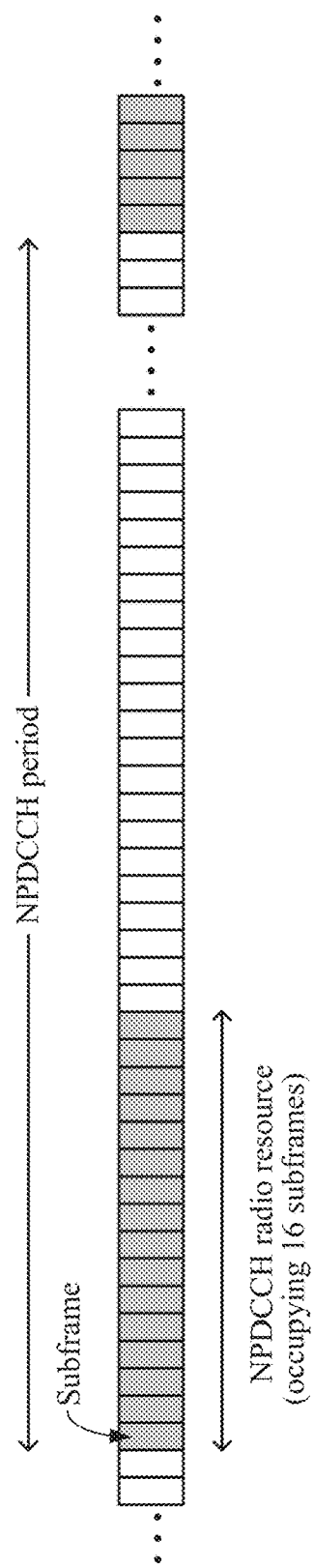
FIG. 1 is a schematic view illustrating an NPDCCH period of an NB-IoT system.
Figure 2:
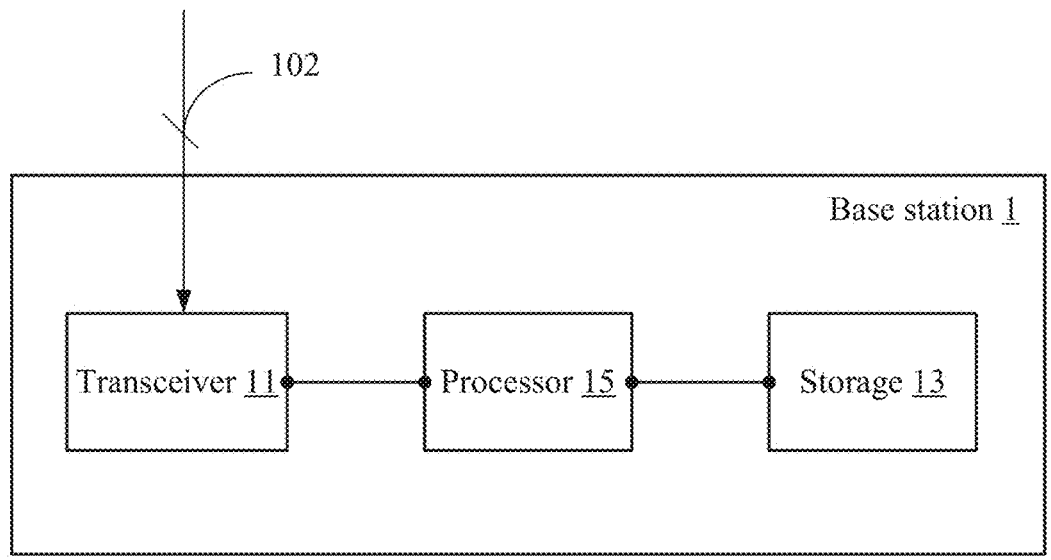
FIG. 2 is a schematic view of a base station 1 according to the present invention.
Figure 3:
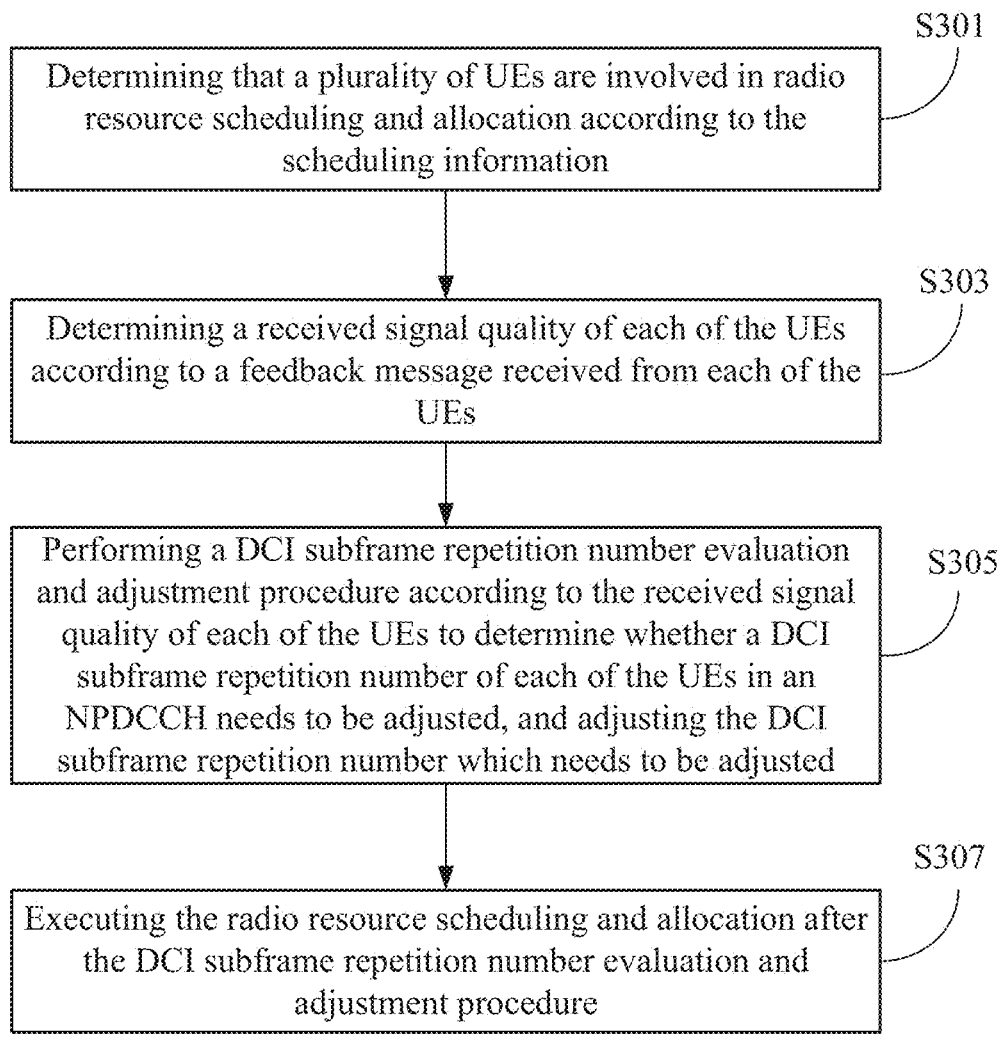
FIG. 3 is a flowchart diagram of a radio resource dynamic allocation method according to a first embodiment of the present invention.
Figure 4:
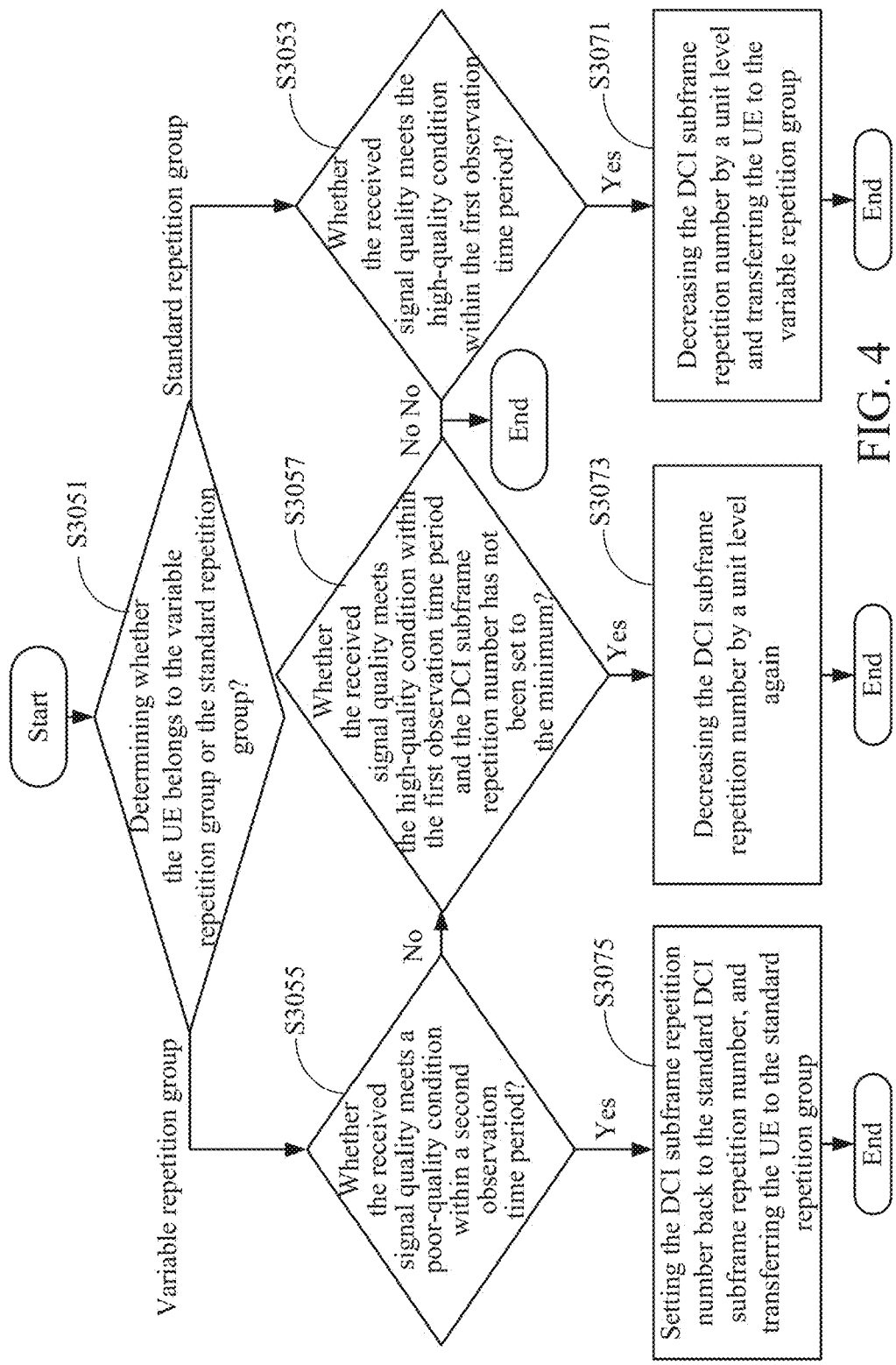
FIG. 4 is a flowchart diagram of a DCI subframe repetition number evaluation and adjustment procedure in a radio resource dynamic allocation method according to a second embodiment of the present invention.

A first embodiment of the present invention is as shown in FIG. 2 and FIG. 3. FIG. 2 is a schematic view of a base station 1 for a Narrowband Internet of Thing (NB-IoT) system. The present invention may be used for the NB-IoT system or other similar wireless communication systems based on time domain scheduling technologies. The NB-IoT system may include a plurality of base stations 1 therein, and each of the base stations 1 may provide services to a plurality of UEs (not shown) within the signal coverage thereof. The base station 1 comprises a transceiver 11, a storage 13, and a processor 15. The processor 15 is electrically connected to the transceiver 11 and the storage 13. It shall be appreciated that, other elements, e.g., an antenna module, a power supply module, or the like, of the base station 1 that are unrelated to the present invention are omitted from depiction in the figures based on the principle of simplification.

As described in the "Descriptions of the Related Art" section, in order to enable the downlink control information (DCI) to be transmitted to UEs around the cell edge of a base station, the base station repeats the transmission of the DCI so as to improve the possibility of successfully decoding the data at the UE end. Therefore, the base station 1 configures the DCI subframe repetition number in a narrowband physical downlink control channel (NPDCCH) based on different coverage enhancement levels (CE levels) where the UEs are located.

For example, if the CE levels are divided into three levels and standard DCI subframe repetition numbers corresponding to the three levels are respectively configured to be 2, 4, and 8, then the base station 1 allocates the subframe at the DCI subframe repetition number corresponding to the CE level where the UE is located, thereby transmitting the downlink control information to the UE. The CE levels and the configuration mechanism of the DCI subframe repetition numbers corresponding to the CE levels shall be appreciated by those of ordinary skill in the art based on the standard made by the $3^{rd}$ Generation Partnership Project (3GPP) with respect to the NB-IoT system, and thus will not be further described herein.

Moreover, how the base station 1 configures the narrowband physical downlink shared channel (NPDSCH) accordingly based on the configuration of the NPDCCH, and how each of the UEs obtains the downlink data thereof in the indicated NPDSCH or transmits the uplink data thereof in the indicated NPUSCH based on the downlink control information carried in the NPDCCH shall also be appreciated by those of ordinary skill in the art based on the standard made by the $3^{rd}$ Generation Partnership Project (3GPP) with respect to the NB-IoT system, and thus will not be further described herein.

FIG. 3 is a flowchart diagram of a radio resource dynamic allocation method according to the present invention, and the method dynamically adjusts the DCI subframe repetition number of each of the UEs, especially the UEs which have established Radio Resource Control (RRC) connection, so that the configuration of the DCI subframe repetition number is not completely limited by the CE level. First, in step S301, the processor 15 determines that a plurality of user equipments (UEs) are involved in radio resource scheduling and allocation according to the scheduling information stored in the storage 13. It shall be appreciated that, the scheduling information is generated by the base station 1 according to the services required by the UEs, and it may record, for each UE, the located CE level, the DCI subframe repetition number currently configured, the data amount to be transmitted and service level or the like, thereby performing the radio resource scheduling and allocation.

Next, in step S303, the processor 15 determines a received signal quality of each UE according to a feedback message 102 received therefrom. For example, the feedback message 102 may be a Hybrid Automatic Repeat reQuest (HARQ) feedback message, a positioning system wireless channel measurement message, a Channel Quality Indicator message and a Link Adaptation message or any combination thereof.

Thereafter, in step S305, the processor 15 performs a DCI subframe repetition number evaluation and adjustment procedure according to the received signal quality of each of the UEs to determine whether a DCI subframe repetition number of each of the UEs in a narrowband physical downlink control channel (NPDCCH) needs to be adjusted, and adjusts the DCI subframe repetition number which needs to be adjusted. Next, in step S307, the processor 15 executes the radio resource scheduling and allocation after the DCI subframe repetition number evaluation and adjustment procedure.

For example, it is assumed that a standard DCI subframe repetition number of a CE level (i.e., the DCI subframe repetition number configured for a CE level) is 4. In the DCI subframe repetition number evaluation and adjustment procedure, for all UEs in the CE level, the processor 15 may sequentially select a UE (hereinafter called the first target UE) among a plurality of UEs and determine whether a received signal quality of which meets a high-quality condition within a first observation time period. In an exemplary example, the first observation time period may be N NPDCCH periods, wherein N is a positive integer, and the received signal quality may be decided based on the content of the HARQ feedback message. In this case, the high-quality condition may be that N continuous HARQ feedback messages all indicate correct decoding (i.e., Acknowledgement (ACK)). N may be adjusted by the base station 1 based on practical operations. If N is 10, then it means that the 10 continuous HARQ feedback messages all need to indicate correct decoding.

In other words, after the data required by the first target UE is transmitted in N continuous or incontinuous NPDCCH periods, the processor 15 may determine whether the data transmitted in the N NPDCCH periods is all correctly decoded by the first target UE according to the HARQ feedback messages reported from the first target UE. If it is all correctly decoded (i.e., N continuous HARQ feedback messages all indicate correct decoding), then the processor 15 determines that the received signal quality of the first target UE meets the high-quality condition within the first observation time period.

When the received signal quality of the first target UE meets the high-quality condition within the first observation time period, the processor 15 decreases the DCI subframe repetition number of the first target UE by a unit level for performing the next radio resource scheduling and allocation. In this exemplary example, decreasing by a unit level means dividing the current DCI subframe repetition number by 2. Therefore, when the standard DCI subframe repetition number is 4, the first decreasing unit level is to decrease the DCI subframe repetition number from 4 to 2, and the second decreasing is to decrease the DCI subframe repetition number from 2 to 1. Accordingly, the processor 15 may decrease the DCI subframe repetition number of the first target UE from 4 to 2 in this DCI subframe repetition number evaluation and adjustment procedure, or further decrease the DCI subframe repetition number to 1 in the next DCI subframe repetition number evaluation and adjustment procedure.

Moreover, in other exemplary examples, the high-quality condition may be that a distance from the base station 1 is less than a threshold value (which is determined based on a positioning system wireless channel measurement message), a channel quality indicator falls within a critical range (which is determined based on a Channel Quality Indicator message), or the modulation and decoding mechanism is superior to a reference modulation and decoding mechanism (which is determined based on a Link Adaptation message), through which the processor 15 determines whether the received signal quality of the first target UE meets the high-quality condition within the N NPDCCH periods.

It shall be appreciated that, the base station 1 may perform the aforesaid radio resource dynamic allocation method in every NPDCCH period or every N NPDCCH periods, and may further determine the time to perform the radio resource dynamic allocation method based on the number of the UEs to be served. Therefore, any frequency or time point at which the radio resource dynamic allocation method of the present invention is performed shall all fall within the scope claimed in this application.

Please refer to FIG. 4, and FIG. 5A to FIG. 5C together for a second embodiment of the present invention. The second embodiment is an extension of the first embodiment, and it further illustrates steps relevant to the DCI subframe repetition number evaluation and adjustment procedure in the radio resource dynamic allocation method, i.e., the step S305 of the first embodiment further comprises steps shown in FIG. 4. In this embodiment, the UEs involved in the radio resource scheduling and allocation are further divided into a standard repetition group and a variable repetition group. Each UE in the standard repetition group has the DCI subframe repetition number equal to the standard DCI subframe repetition number, i.e., whose DCI subframe repetition number is not adjusted, or is adjusted back to the standard DCI subframe repetition number. Each UE in the variable repetition group has the DCI subframe repetition number having been adjusted, i.e., whose DCI subframe repetition number is not equal to the standard DCI subframe repetition number.

The processor 15 sequentially selects each UE from the standard repetition group (the UEs in the standard repetition group are collectively referred to as first target UEs) and selects each UE from the variable repetition group (the UEs in the variable repetition group are collectively referred to as second target UEs). In step S3051, the processor 15 further determines whether the UE belongs to the variable repetition group or the standard repetition group.

First, for a first target UE selected from the standard repetition group, the processor 15 determines whether the received signal quality of the first target UE meets the high-quality condition within the first observation time period in step S3053. As described in the first embodiment, the first observation time period may be N NPDCCH periods, and the high-quality condition may be that N continuous HARQ feedback messages all indicate correct decoding (i.e., Acknowledgement (ACK)).

Thereafter, if the received signal quality of the first target UE meets the high-quality condition within the first observation time period, then step S3071 is executed to decrease the DCI subframe repetition number of the first target UE by a unit level and transfer the first target UE to the variable repetition group. On the contrary, if the received signal quality of the first target UE does not meet the high-quality condition within the first observation time period, then it means that the DCI subframe repetition number of the first target UE cannot be decreased currently, and therefore the evaluation and adjustment procedure on the first target UE is ended, i.e., no adjustment is made on the DCI subframe repetition number.

Figure 5A:
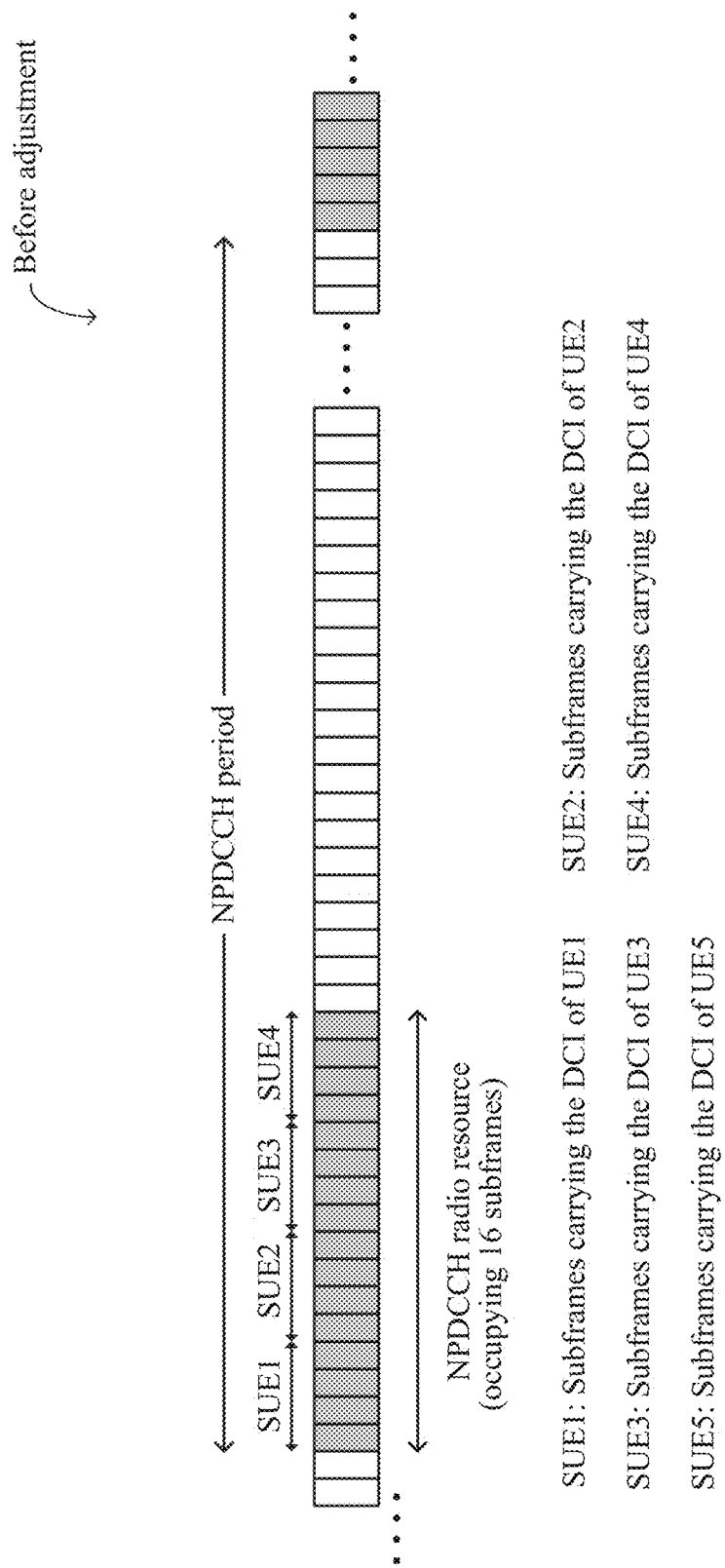
FIG. 5A to FIG. 5C depict an exemplary embodiment of executing the DCI subframe repetition number evaluation and adjustment procedure according to the present invention.
Figure 5B:
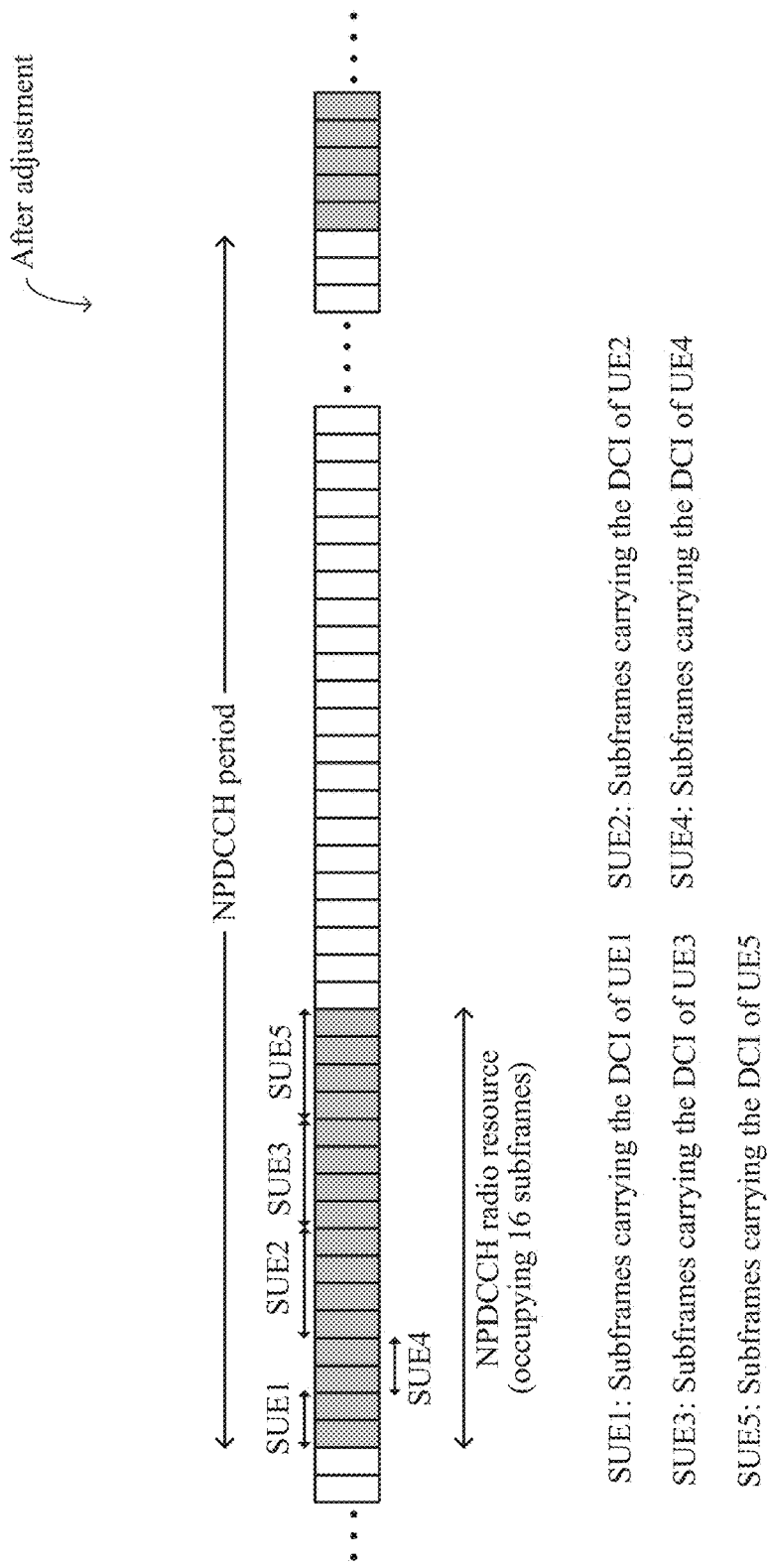

For example, as shown in FIG. 5A to FIG. 5B, it is assumed that the NPDCCH radio resource is configured to be 16 subframes, and in a NPDCCH period, the processor 15 allocates the 16 subframes respectively to four UEs UE1, UE2, UE3 and UE4 at the same CE level, and the DCI subframe repetition number of each of the four UEs is equal to the standard DCI subframe repetition number (e.g., 4). Accordingly, the processor 15 allocates 4 subframes to each of the four UEs UE1, UE2, UE3 and UE4, i.e., the subframes SUE1, the subframes SUE2, the subframes SUE3, and the subframes SUE4, thereby transmitting the downlink control information of the UEs.

After the steps S3051, S3053, and S3071 are executed on the UEs UE1, UE2, UE3 and UE4, the processor 15 decreases the DCI subframe repetition number of each of UEs UE1 and UE4, of which the received signal quality meets the high-quality condition within the first observation time period, by a unit level (e.g., decreases to 2), and transfers the UEs UE1 and UE4 to the variable repetition group. However, the DCI subframe repetition number of each of UEs UE2 and UE3, of which the received signal quality does not meet the high-quality condition within the first observation time period, remains at the standard DCI subframe repetition number, and the UEs UE2 and UE3 remain in the standard repetition group.

Through the aforesaid DCI subframe repetition number adjustment, since the subframe number required for transmitting the downlink control information of the UEs UE1 and UE4 has been decreased to 2, the processor 15 can use the 16 subframes of the NPDCCH to transmit the downlink control information of another UE UE5 in addition to the downlink control information of the UEs UE1, UE2, UE3 and UE4, in the radio resource scheduling and allocation during a subsequent NPDCCH period. In this way, through the aforesaid DCI subframe repetition number evaluation and adjustment procedure, the base station 1 can transmit the downlink control information and data required by more UEs in the NPDCCH period so that the radio resources of the NPDSCH or the NPUSCH can be sufficiently allocated for use.

It shall be appreciated that, the UE UE5 may be at the same CE level as the UEs UE1, UE2, UE3 and UE4, so the standard DCI subframe repetition number thereof is equal to 4; or the UE UE5 may be at a CE level different from that of the UEs UE1, UE2, UE3 and UE4, so the DCI subframe repetition number thereof is the DCI subframe repetition number that has been adjusted (e.g., decreased from 8 to 4).

Next, for a second target UE in a variable repetition group, the processor 15 determines whether the received signal quality of the second target UE meets a poor-quality condition within a second observation time period in step S3055. Similarly, the second observation time period may be M NPDCCH radio resource periods, wherein M is a positive integer, and the poor-quality condition may be that M continuous HARQ feedback messages all indicate decoding failure (i.e., Non-Acknowledgement (NACK)). If M is 2, then it means that it is determined that the received signal quality of the second target UE meets the poor-quality condition within the second observation time period only if the two continuous HARQ feedback messages all indicate decoding failure.

It shall be appreciated that, if M is 1, then it means that once the HARQ feedback message reported from the second target UE indicates decoding failure, it is determined that the received signal quality of the second target UE meets the poor-quality condition within the second observation time period. Moreover, in other exemplary examples, the poor-quality condition may be that a distance from the base station 1 is larger than a threshold value (which is determined based on a positioning system wireless channel measurement message), a channel quality indicator falls within a critical range (which is determined based on a Channel Quality Indicator message), or the modulation and decoding mechanism is inferior to a reference modulation and decoding mechanism (which is determined based on a Link Adaptation message), through which the processor 15 determines whether the received signal quality of the second target UE meets the poor-quality condition within M NPDCCH periods.

Thereafter, if the received signal quality of the second target UE meets the poor-quality condition within the second observation time period, then step S3075 is executed to set the DCI subframe repetition number of the second target UE back to the standard DCI subframe repetition number (e.g., set back to 4 from 2), and transfer the second target UE to the standard repetition group. Otherwise, step S3057 is executed to further determine whether the received signal quality of the second target UE meets the high-quality condition within the first observation time period and whether the DCI subframe repetition number of the second target UE has not been set to the minimum DCI subframe repetition number (e.g., 1). If the received signal quality of the second target UE meets the high-quality condition within the first observation time period and the DCI subframe repetition number thereof has not been set to the minimum DCI subframe repetition number, then step S3073 is executed to decrease the DCI subframe repetition number of the second target UE by a unit level again (e.g., decrease from 2 to 1). On the contrary, if the received signal quality of the second target UE does not meet the high-quality condition within the first observation time period, or the received signal quality meets the high-quality condition but the DCI subframe repetition number thereof has been set to the minimum DCI subframe repetition number, then it means that the DCI subframe repetition number of the second target UE does not need to be adjusted and the second target UE does not need to be transferred between the groups, so the evaluation and adjustment procedure on the second target UE is ended.

Figure 5C:
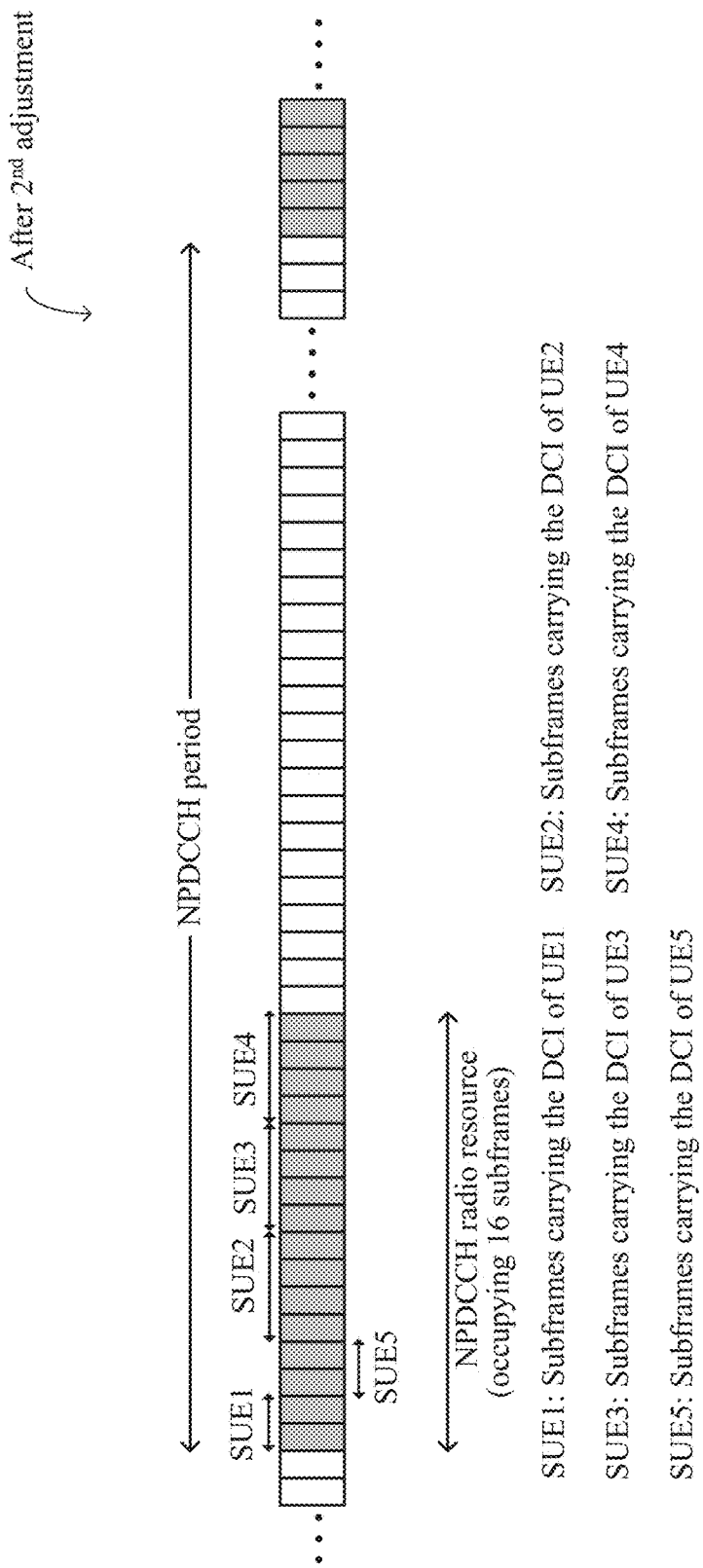

For example, as shown in FIG. 5B to FIG. 5C, it is assumed that the UEs UE1, UE4 and UE5 belong to the second target UEs in the variable repetition group. The processor 15 executes the steps S3055, S3057, S3073 and S3075 on the UEs UE1, UE4 and UE5. If the received signal quality of the UE UE4 meets the poor-quality condition within the second observation time period, then the processor 15 sets the DCI subframe repetition number of the UE UE4 back to the standard DCI subframe repetition number (i.e., sets back to 4 from 2).

If the received signal quality of the UE UE1 does not meet the poor-quality condition within the second observation time period and does not meet the high-quality condition within the first observation time period either (i.e., among the recent HARQ feedback messages, only one HARQ feedback message indicates decoding failure, while there are no two continuous HARQ feedback messages indicating decoding failure, and no ten continuous HARQ feedback messages indicating correct decoding), then the processor 15 keeps the DCI subframe repetition number of the UE UE1 at the current DCI subframe repetition number and keeps the UE UE1 in the variable repetition group.

If the received signal quality of the UE UE5 does not meet the poor-quality condition within the second observation time period but meets the high-quality condition within the first observation time period (i.e., among the recent HARQ feedback messages, there are no two continuous HARQ feedback messages indicating decoding failure, but there are ten continuous HARQ feedback messages indicating correct decoding), and the current DCI subframe repetition number thereof has not been set to the minimum DCI subframe repetition number (e.g., 1), then the processor 15 decreases the DCI subframe repetition number of the UE UE5 by a unit level again (e.g., decreases from 4 to 2).

It shall be appreciated that, for simplification of the description, it is assumed in the aforesaid FIG. 5A to FIG. 5C that the UEs UE1, UE2, UE3, UE4 and UE5 are all UEs which have established RRC connection, and the resources required by the UEs are all general resources and are not related to random access or paging, so the 16 subframes of the whole NPDCCH all belong to the UE-specific search space. However, as shall be appreciated by those of ordinary skill in the art, during the practical operation of the base station, the configuration of the NPDCCH is not limited to 16 subframes, and the NPDCCH may have several search spaces at the same time (i.e., there is a search space for random access or a search space for paging). How to apply the radio resource dynamic allocation method of the present invention to practical operation conditions of the base station shall be appreciated by those of ordinary skill in the art based on the description of the above embodiments, and thus will not be further described herein.

In addition to the aforesaid steps, the radio resource dynamic allocation method of this embodiment can also execute all the operations and functions set forth in the first embodiment. How this embodiment executes these operations and functions will be readily appreciated by those of ordinary skill in the art based on the explanation of the first embodiment, and thus will not be further described herein.

Figure 6A:
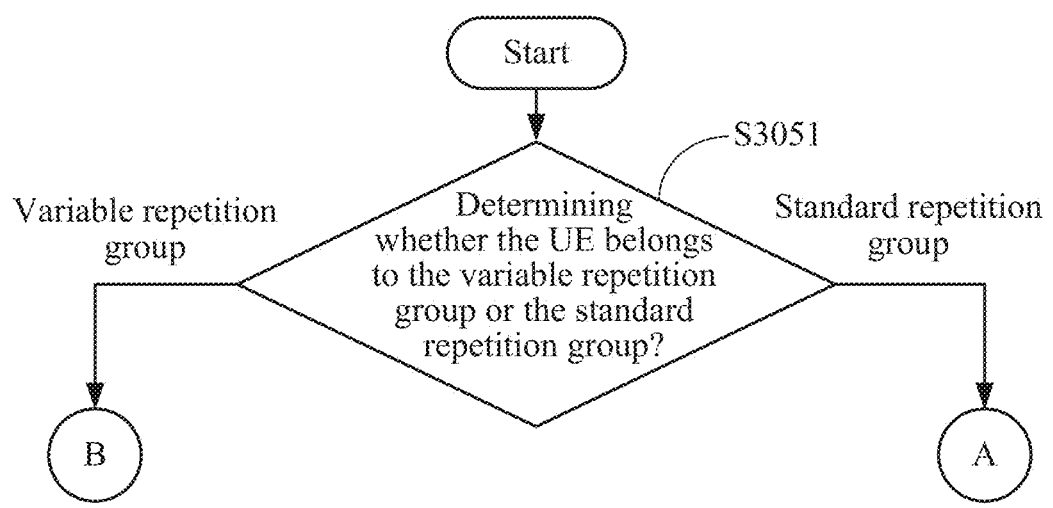
FIG. 6A to FIG. 6C are flowchart diagrams of a DCI subframe repetition number evaluation and adjustment procedure in a radio resource dynamic allocation method according to a third embodiment of the present invention.
Figure 6B:
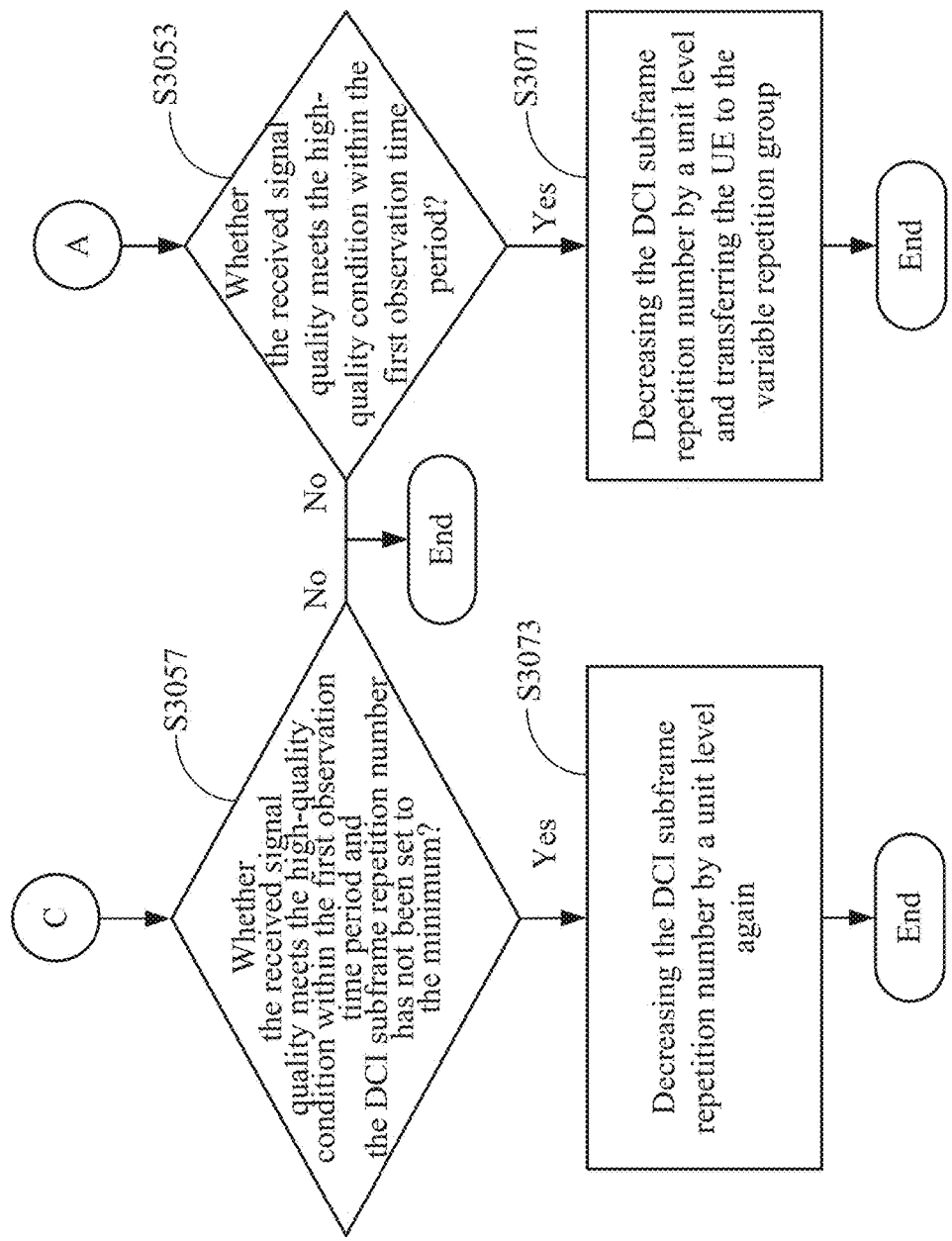
Figure 6C:
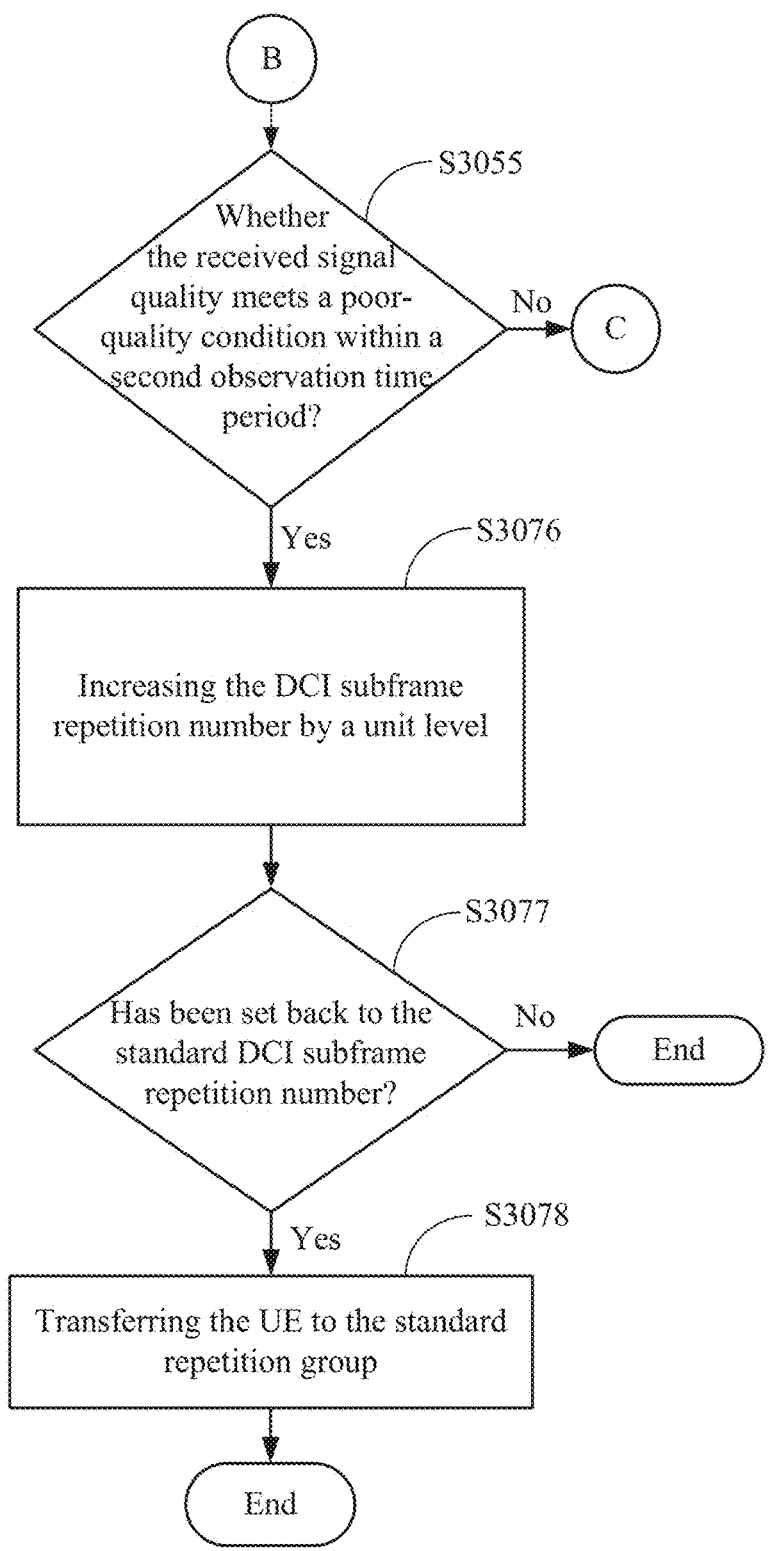

Please refer to FIG. 6A to FIG. 6C together for a third embodiment of the present invention. The third embodiment is also an extension of the first embodiment, and it further illustrates steps relevant to the DCI subframe repetition number evaluation and adjustment procedure in the radio resource dynamic allocation method, i.e., the step S305 of the first embodiment further comprises steps shown in FIG. 6A to FIG. 6C. The DCI subframe repetition number evaluation and adjustment procedure in this embodiment differs from the second embodiment in that, after it is determined in the step S3055 that the received signal quality of the second target UE meets the poor-quality condition within the second observation time period, step S3076 is executed to increase the DCI subframe repetition number of the second target UE by a unit level (e.g., increase from 2 to 4). In this exemplary example, increasing by a unit level means multiplying the current DCI subframe repetition number by 2.

Next, in step S3077, the processor 15 determines whether the DCI subframe repetition number of the second target UE has been set back to the standard DCI subframe repetition number. If the DCI subframe repetition number of the second target UE has been set back to the standard DCI subframe repetition number after being increased by a unit level in the step S3076, then the processor 15 executes step S3078 to transfer the second target UE to the standard repetition group. On the contrary, if the DCI subframe repetition number of the second target UE has not been set back to the standard DCI subframe repetition number after increasing the DCI subframe repetition number of the second target UE by a unit level in the step S3076, then the evaluation and adjustment procedure on the second target UE is ended without the need of transferring the second target UE to the standard repetition group.

As can be known from the above descriptions, the DCI subframe repetition number evaluation and adjustment procedure of this embodiment differs from the second embodiment in that: after it is determined that the received signal quality of the second target UE meets the poor-quality condition within the second observation time period, first the DCI subframe repetition number of the second target UE is increased by a unit level instead of directly setting the DCI subframe repetition number of the second target UE back to the standard DCI subframe repetition number. Moreover, after increasing the DCI subframe repetition number of the second target UE by a unit level in the DCI subframe repetition number evaluation and adjustment procedure of this embodiment, the second target UE will not be transferred to the standard repetition group simply by increasing the DCI subframe repetition number of the second target UE by a unit level for one time, unless the DCI subframe repetition number that has been adjusted is equal to the standard DCI subframe repetition number.

Similarly, in addition to the aforesaid steps, the radio resource dynamic allocation method of this embodiment can also execute all the operations and functions set forth in the first embodiment. How this embodiment executes these operations and functions will be readily appreciated by those of ordinary skill in the art based on the explanation of the first embodiment, and thus will not be further described herein.

According to the above descriptions, the present invention provides a radio resource dynamic allocation mechanism, which enables a base station to determine a received signal quality of each of UEs according to a feedback message received from each of the UEs to dynamically adjust the DCI subframe repetition number of each of the UEs so that the configuration of the DCI subframe repetition number is not completely limited by the CE level. In this way, the present invention can perform the radio resource scheduling and allocation based on the DCI subframe repetition number dynamically adjusted for each of the UEs so as to serve more UEs with the limited radio resources, thereby preventing the waste of the radio resources, and thus improving the utilization ratio of the radio resources, the total throughput capacity of the system, and the resource scheduling flexibility.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station for a Narrowband Internet of Thing (NB-IoT) system, comprising:

a storage, being configured to store scheduling information;
a transceiver; and
a processor electrically connected to the storage and the transceiver, being configured to execute the following steps:
   determining that a plurality of user equipments (UEs) are involved in radio resource scheduling and allocation according to the scheduling information;
   determining a received signal quality of each of the UEs according to a feedback message received from each of the UEs via the transceiver;
   performing a downlink control information (DCI) subframe repetition number evaluation and adjustment procedure according to the received signal quality of each of the UEs to determine whether a DCI subframe repetition number of each of the UEs in a narrowband physical downlink control channel (NPDCCH) needs to be adjusted, and adjusting the DCI subframe repetition number which needs to be adjusted; and
   executing the radio resource scheduling and allocation after the DCI subframe repetition number evaluation and adjustment procedure.

2. The base station according to claim 1, wherein the UEs are at a same Coverage Enhancement Level (CE Level).

3. The base station according to claim 1, wherein the DCI subframe repetition number evaluation and adjustment procedure comprises:
   selecting a first target UE from the UEs;
   determining whether the received signal quality of the first target UE meets a high-quality condition within a first observation time period; and
   decreasing the DCI subframe repetition number of the first target UE by a unit level when the received signal quality of the first target UE meets the high-quality condition within the first observation time period.

4. The base station according to claim 3, wherein the first target UE is selected from a standard repetition group, the DCI subframe repetition numbers of the UEs in the standard repetition group are all preset to a standard DCI subframe repetition number, and the DCI subframe repetition number evaluation and adjustment procedure further comprises:
   transferring the first target UE to a variable repetition group after the DCI subframe repetition number of the first target UE is decreased by the unit level.

5. The base station according to claim 4, wherein the DCI subframe repetition number evaluation and adjustment procedure further comprises:
   selecting a second target UE from the UEs of the variable repetition group;
   determining whether the received signal quality of the second target UE meets a poor-quality condition within a second observation time period;
   setting the DCI subframe repetition number of the second target UE back to the standard DCI subframe repetition number when the received signal quality of the second target UE meets the poor-quality condition within the second observation time period; and
   transferring the second target UE to the standard repetition group after the DCI subframe repetition number of the second target UE is set back to the standard DCI subframe repetition number.

6. The base station according to claim 4, wherein the DCI subframe repetition number evaluation and adjustment procedure further comprises:
   selecting a second target UE from the UEs of the variable repetition group;
   determining whether the received signal quality of the second target UE meets a poor-quality condition within a second observation time period;
   increasing the DCI subframe repetition number of the second target UE by the unit level when the received signal quality of the second target UE meets the poor-quality condition within the second observation time period;
   determining whether the DCI subframe repetition number of the second target UE has been set back to the standard DCI subframe repetition number; and
   transferring the second target UE to the standard repetition group when the DCI subframe repetition number of the second target UE has been set back to the standard DCI subframe repetition number.

7. The base station according to claim 4, wherein the DCI subframe repetition number evaluation and adjustment procedure further comprises:
   selecting a second target UE from the UEs of the variable repetition group;
   determining whether the received signal quality of the second target UE meets a poor-quality condition within a second observation time period;
   determining whether the received signal quality of the second target UE meets the high-quality condition within the first observation time period when the received signal quality of the second target UE does not meet the poor-quality condition within the second observation time period;
   determining whether the DCI subframe repetition number of the second target UE has been set to a minimum DCI subframe repetition number when the received signal quality of the second target UE meets the high-quality condition within the first observation time period; and
   decreasing the DCI subframe repetition number of the second target UE by the unit level again when the DCI subframe repetition number of the second target UE has not been set to the minimum DCI subframe repetition number.

8. The base station according to claim 1, wherein the feedback message comprises at least one of the following: a Hybrid Automatic Repeat reQuest (HARQ) feedback message, a positioning system wireless channel measurement message, a Channel Quality Indicator message and a Link Adaptation message.

9. A radio resource dynamic allocation method for a base station of a Narrowband Internet of Thing (NB IoT) system, the base station comprising a storage, a transceiver and a processor, the storage being configured to store scheduling information, and the radio resource dynamic allocation method being executed by the processor and comprising:
   determining that a plurality of user equipments (UEs) are involved in a radio resource scheduling and allocation according to the scheduling information;
   determining a received signal quality of each of the UEs according to a feedback message received from each of the UEs via the transceiver;
   performing a downlink control information (DCI) subframe repetition number evaluation and adjustment procedure according to the received signal quality of each of the UEs to determine whether a DCI subframe repetition number of each of the UEs in a narrowband physical downlink control channel (NPDCCH) needs to be adjusted, and adjusting the DCI subframe repetition number which needs to be adjusted; and executing the radio resource scheduling and allocation after the DCI subframe repetition number evaluation and adjustment procedure.

10. The radio resource dynamic allocation method according to claim 9, wherein the UEs are at a same Coverage Enhancement Level (CE Level).

11. The radio resource dynamic allocation method according to claim 9, wherein the DCI subframe repetition number evaluation and adjustment procedure comprises:
   selecting a first target UE from the UEs;
   determining whether the received signal quality of the first target UE meets a high-quality condition within a first observation time period; and
   decreasing the DCI subframe repetition number of the first target UE by a unit level when the received signal quality of the first target UE meets the high-quality condition within the first observation time period.

12. The radio resource dynamic allocation method according to claim 11, wherein the first target UE is selected from a standard repetition group, the DCI subframe repetition numbers of the UEs in the standard repetition group are all preset to a standard DCI subframe repetition number, and the DCI subframe repetition number evaluation and adjustment procedure further comprises:
   transferring the first target UE to a variable repetition group after the DCI subframe repetition number of the first target UE is decreased by the unit level.

13. The radio resource dynamic allocation method according to claim 12, wherein the DCI subframe repetition number evaluation and adjustment procedure further comprises:
   selecting a second target UE from the UEs of the variable repetition group;
   determining whether the received signal quality of the second target UE meets a poor-quality condition within a second observation time period;
   setting the DCI subframe repetition number of the second target UE back to the standard DCI subframe repetition number when the received signal quality of the second target UE meets the poor-quality condition within the second observation time period; and
   transferring the second target UE to the standard repetition group after the DCI subframe repetition number of the second target UE is set back to the standard DCI subframe repetition number.

14. The radio resource dynamic allocation method according to claim 12, wherein the DCI subframe repetition number evaluation and adjustment procedure further comprises:
   selecting a second target UE from the UEs of the variable repetition group;
   determining whether the received signal quality of the second target UE meets a poor-quality condition within a second observation time period;
   increasing the DCI subframe repetition number of the second target UE by the unit level when the received signal quality of the second target UE meets the poor-quality condition within the second observation time period;
   determining whether the DCI subframe repetition number of the second target UE has been set back to the standard DCI subframe repetition number; and
   transferring the second target UE to the standard repetition group when the DCI subframe repetition number of the second target UE has been set back to the standard DCI subframe repetition number.

15. The radio resource dynamic allocation method according to claim 12, wherein the DCI subframe repetition number evaluation and adjustment procedure further comprises:
   selecting a second target UE from the UEs of the variable repetition group;
   determining whether the received signal quality of the second target UE meets a poor-quality condition within a second observation time period;
   determining whether the received signal quality of the second target UE meets the high-quality condition within the first observation time period when the received signal quality of the second target UE does not meet the poor-quality condition within the second observation time period;
   determining whether the DCI subframe repetition number of the second target UE has been set to a minimum DCI subframe repetition number when the received signal quality of the second target UE meets the high-quality condition within the first observation time period; and
   decreasing the DCI subframe repetition number of the second target UE by the unit level again when the DCI subframe repetition number of the second target UE has not been set to the minimum DCI subframe repetition number.

16. The radio resource dynamic allocation method according to claim 9, wherein the feedback message comprises at least one of the following: a Hybrid Automatic Repeat reQuest (HARQ) feedback message, a positioning system wireless channel measurement message, a Channel Quality Indicator message and a Link Adaptation message.

* * * * *